Figure 3:
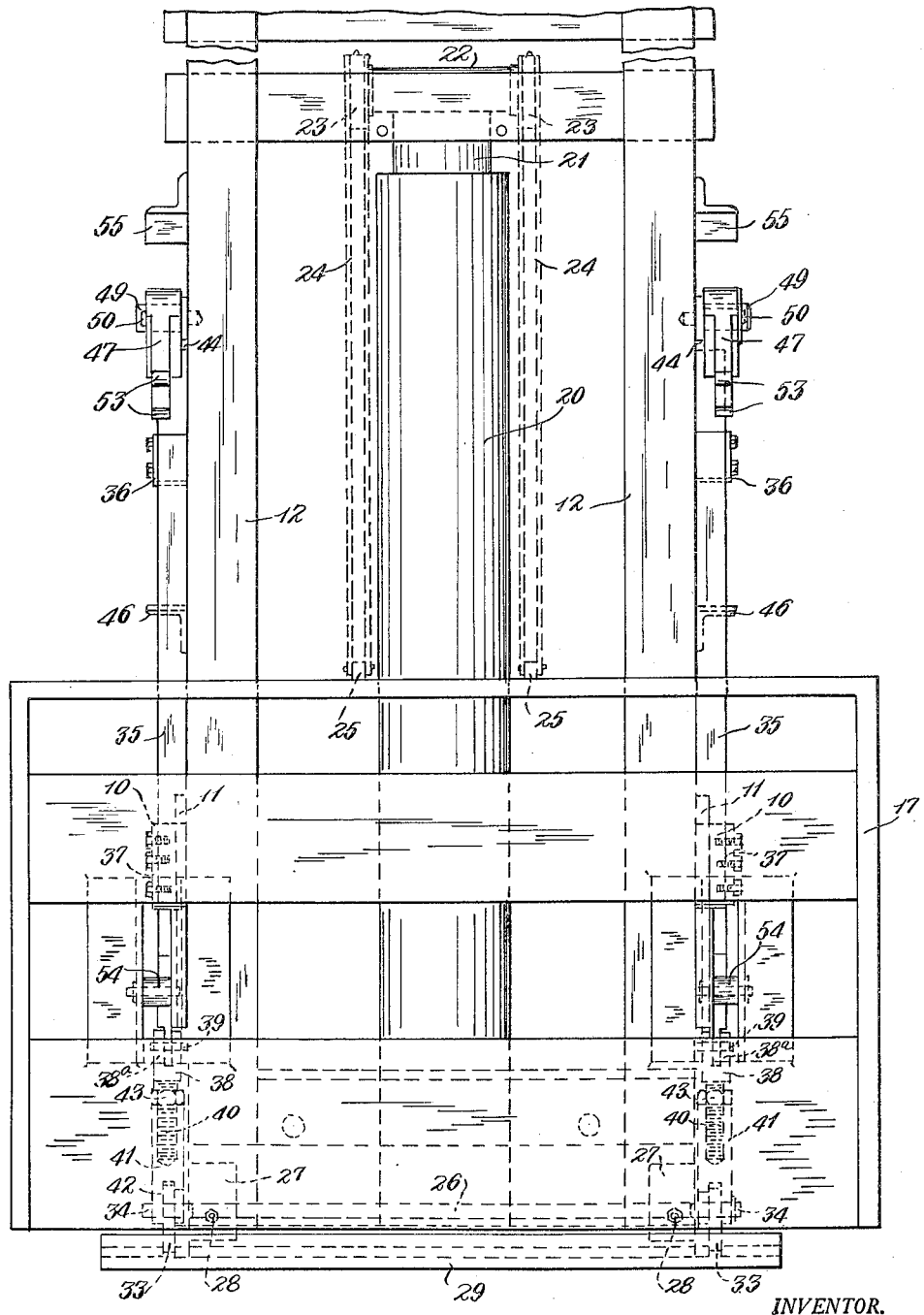

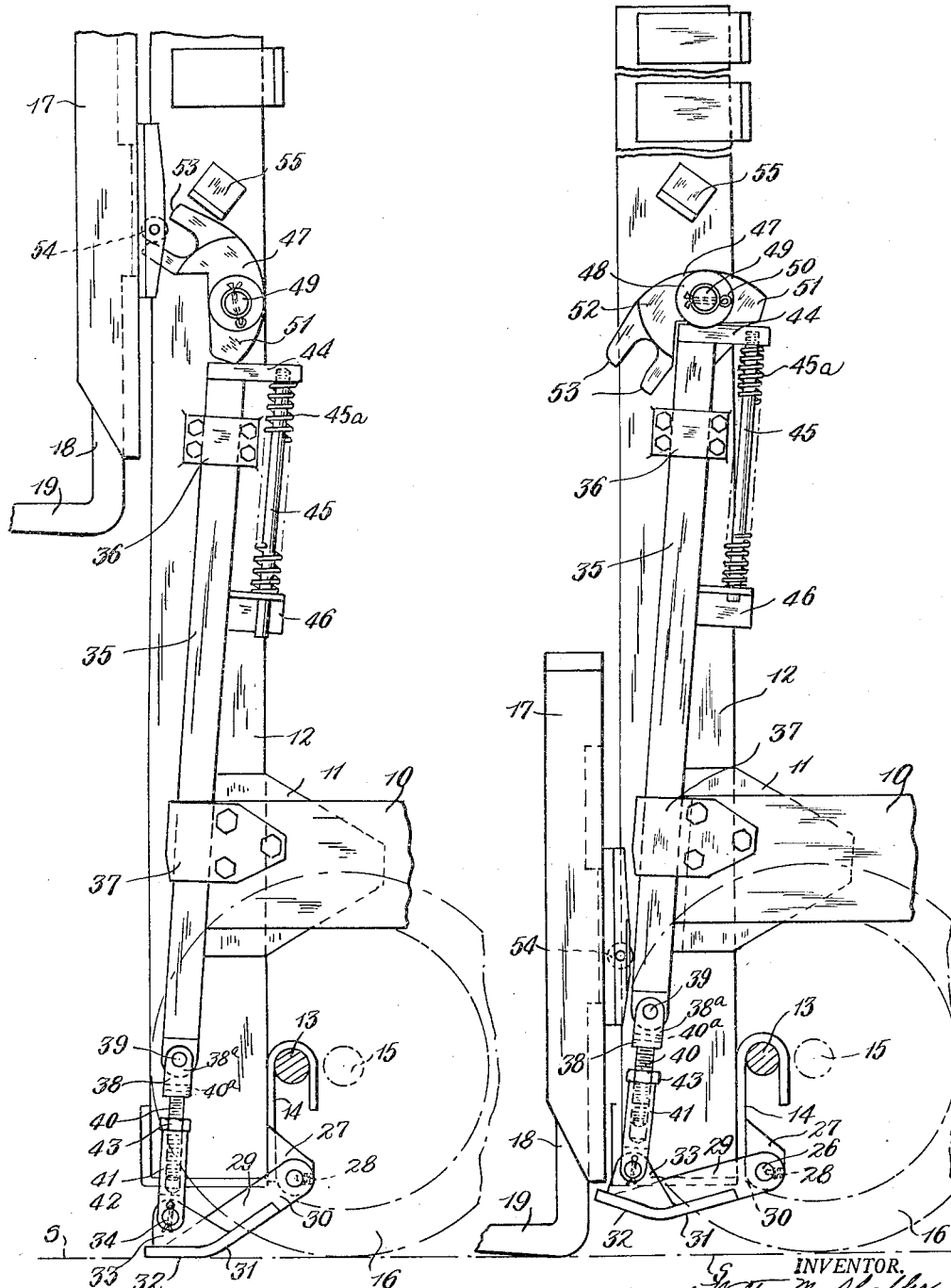

UNITED STATES PATENT OFFICE 2,541,298

INDUSTRIAL TRUCK

Walter M. Shaffer, Wickliffe, Ohio, assignor to Towmotor Corporation, Cleveland, Ohio, a corporation of Ohio Application September 14, 1946, Serial No. 697,120

16 Claims. (Cl. 214—113)

This invention relates to industrial trucks, and more particularly to trucks of the type wherein a carriage provided with a forwardly projecting load support is mounted for sliding movement along a mast carried by the front of such a truck and wherein the truck carries at its rear end a counterweight for the purpose of preventing the tilting of the truck about its front axle by the reaction exerted by heavy loads upon said load support when the mast is tilted forwardly for the purpose of facilitating the discharge of the load.

The general purpose and object of this invention is to provide a truck of the character referred to with simple and effective means whereby this tendency to tilt or rotate the truck about its front wheels or axle under the conditions specified may be prevented or stabilized.

In the practice of my invention, I provide for the said truck a stabilizing support carried by its mast at the lower end thereof and which stabilizing support is adapted to be brought into engagement with the surface beneath the mast when the mast is tilted forwardly and to be brought out of engagement with the said surface when the mast is tilted rearwardly or to a substantially vertical position. Still further, in the practice of my invention, I prefer to pivotally mount the stabilizing support adjacent to the lower end of the mast and normally projecting somewhat below the lower end of the mast and the surface engaging portion of which may be depressed into engagement with the surface therebeneath when the mast is tilted forwardly beyond the desirable limit where the load on the load support is heavy. I accomplish this depression, preferably automatically, through means operable by the raising and lowering movements of the carriage.

Both the general and more limited objects of my invention will be realized in and through the construction and arrangement of parts shown in the drawings hereof, wherein Fig. 1 represents a side elevational view of the front portion of the frame, one of the front wheels, the mast, and the carriage of an industrial truck equipped with my invention and showing the stabilizing support in its elevated or normal position; Fig. 2 a view similar to Fig. 1 and showing the stabilizer in its depressed position; and Fig. 3 a front elevational view of the parts shown in Fig. 1.

Describing the parts by reference characters, 10 denotes one of the tilt arms of an industrial truck of standard construction and 11 one of the gusset plates connected to the side members 12 of the mast and the tilt arms 10 which are reciprocable by well known connections (not shown) for the purpose of tilting the mast about a pivotal cross bar 13. The mast is supported on bar 13 by means of an elongated hook plate 14 secured to the lower surface of the side frame members and resting upon the said cross bar. This cross bar is shown as located adjacent to the axle 15 for the front wheels 16.

17 denotes a carriage which is provided at its bottom with a forwardly projecting load support, the load support as shown herein consisting of forks each having a vertical member 18, supported by and between the sides of the carriage, and a substantially horizontal supporting member 19.

The carriage is mounted for vertical sliding movement along the side members 12 of the mast and is raised and lowered by any convenient operating mechanism well known in the art, such as a cylinder 20, a plunger 21 therein, a cross head 22, rollers 23 on said cross head and chains 24 connected each at one end to an immovable part of the truck, which may be the bottom portion of the mast assembly and at its other end to the carriage, as indicated at 25.

The parts thus far described are of standard construction and, in their details, constitute no part of the invention.

Referring to the novel stabilizing arrangement, 26 denotes a shaft which is supported by brackets 27 secured to and projecting rearwardly from the hook plate 14. The shaft is anchored against transverse movement, whereby its ends might engage either of the wheels 16, by means of screw bolts 28, which secure the same to the brackets 27.

29 denotes the shoe, the same extending transversely of and beneath the side members of the mast and having webs 30 extending rearwardly from the bottom at opposite ends thereof by which the shoe is rotatably mounted upon the outer ends of the shaft 26. The transverse body of the shoe has a rear portion 31 extending preferably the full length thereof and a front ground or surface engaging portion 32 also extending the full length thereof and which forms an obtuse angle with the portion 31 and the bottom of which is adapted to be brought into engagement throughout its entire area with the surface S beneath the mast.

Adjacent to each end of the front portion 32, the shoe is provided with a vertical triangular web 33 by means of which the opposite ends of the shoe are pivotally connected by pivot pins 34 with operating rods whereby the forward portion of the shoe may be raised and lowered. The operating rods comprise generally main rod members 35 which are slidably mounted in guides 36, 37 provided respectively therefor and secured to the outer surfaces of the side members 12. The lower end of each rod member 35 is connected to its pivot pin 34 and the corresponding triangular web of the shoe by means of a link comprising a yoke 38 the upwardly extending legs 38ᵃ whereof are pivotally connected to the lower end of the rod member 35 by means of a pin 39. 40 denotes a screw bolt extending through the base of each yoke 38 and provided with a head 40ᵃ supported by the said base. The bolts are threaded into sleeves 41, the lower ends of which are forked, as shown at 42, and the forks receive the upper ends of the cooperating triangular webs 33 and the pivot pins 34. 43 denotes a lock nut mounted upon the screw 40, which serves to retain the screw bolt and the sleeve 41 in relative positions to which they shall have been adjusted.

44 denotes a pressure plate which is secured to the upper end of each of the rod members 35 and which extends rearwardly therefrom. 45 denotes a rod having its upper end secured to the rear portion of each of the pressure plates and its lower end slidably mounted in a bracket 46 secured to the appropriate side member 12, and a spring 45a is disposed between bracket 46 and pressure plate 44 in order to lift the shoe to its retracted or inactive position.

47 denotes generally an operating or actuating member for depressing each of the rod members 35, each operating member being pivotally mounted upon its appropriate side member 12 by means of a hub 48 and a stud 49, the studs projecting outwardly from the respective side members and the hubs being retained upon the studs, as by means of cotter pins 50.

Each operating member has a cam portion 51 extending rearwardly from the hub and an arm portion 52 extending forwardly from said hub, the longitudinal axis of said arm forming an oblique angle with the longitudinal axis of the cam and being provided at its front end with abutment means in the form of forks 53.

54 denotes means movable with the load support assembly in the form of rollers carried by opposite side portions of the carriage 17 and so located that, when the carriage is elevated to a predetermined intermediate position, the rollers will enter the spaces between the forks 53 and rock the operating or actuating members 47 to the position shown for the operating member on Fig. 2, wherein the cam 51 has depressed the rod member 35, thereby to bring the bottom of the front portion 32 of the shoe into engagement or into approximate engagement with the surface therebeneath. Further elevation of the carriage leaves the actuating and auxiliary load support means in their active position. In practice, it is preferable to have this portion of each shoe slightly spaced above said surface, whereby it will be brought into full engagement therewith only when the mast shall have been tilted forwardly a slight distance.

This operation will be effected when heavy loads will have been placed upon the load support 18, 19 and which loads, when elevated to the height indicated by the position of the carriage in Fig. 2, might overbalance the counterweights at the rear of the truck and cause the same to tilt forwardly about the front axle 15. The shoe will not only prevent such tilting of the mast but will enable the load to be lifted even further without lifting the rear end of the truck or rendering it necessary to apply additional counterweights thereto.

When the carriage descends to the aforesaid intermediate position, the rollers 54 will enter the spaces between the forks 53 and will rotate the operating members 47 to the position of the one shown in Fig. 1, the forks 53 being retained in position for the reception of the rollers on the descent of the carriage by angle stops 55. These stops also, together with the then location of the engaging portions of the cams in front of vertical lines extending downwardly from the centers of the studs 49, will positively lock the rods 35 in their downward positions.

Having thus described my invention, what I claim is:

1. An industrial truck comprising a frame, front wheels supporting said frame, a mast supported adjacent to its lower end by said frame for pivotal movements and means for tilting the same about its pivotal support, a carriage movable along said mast and provided with a load support projecting forwardly therefrom, a shoe supported by said mast adjacent to the lower end of the latter, a rod slidably mounted on said mast and connected at its lower end to said shoe, and means engageable by the carriage for depressing said rod and for holding the same depressed when the carriage is elevated a predetermined distance, thereby to depress the shoe below the bottom of said mast.

2. An industrial truck comprising a frame, front wheels supporting said frame, a mast supported adjacent to its lower end by said frame for pivotal movements and means for tilting the same about its pivotal support, a carriage movable along said mast and provided with a load support projecting forwardly from the lower portion thereof; a shoe pivotally supported by said mast adjacent to the lower end of the latter, a rod slidably mounted on said mast and connected at its lower end to said shoe, means engageable by the said carriage for depressing said rod and the shoe attached thereto and for holding the same so depressed when the carriage is elevated a predetermined distance, the said means being also engageable by said carriage on its return movement for releasing the rod from its depressed position, and spring means for elevating the said rod when the latter is so released.

3. An industrial truck comprising a frame, front wheels supporting said frame, a mast comprising side members and supported adjacent to its lower end by said frame for pivotal movements and means for tilting the same about its pivotal support, a carriage movable along said mast and provided with a load support projecting forwardly from the lower portion thereof; a shoe pivotally supported by the side members of the said mast adjacent to the lower ends of the latter, rods slidably mounted on the said side members and connected at their lower ends to the said shoe, and means engageable by the said carriage for depressing the said rods and for holding the same depressed when the carriage is elevated a predetermined distance, thereby to depress the shoe below the bottom of said mast.

4. An industrial truck comprising a frame, front wheels supporting said frame, a mast comprising side members and supported adjacent to its lower end by said frame for pivotal movements and means for tilting the same about its pivotal support, a carriage movable along said mast and provided with a load support projecting forwardly from the lower portion thereof; a shoe pivotally supported by the side members of the said mast adjacent to the lower ends of the latter, rods slidably mounted on the said side members and connected at their lower ends to the said shoe, and means engageable by the said carriage for depressing the said rods and the shoe attached thereto and for holding the same so depressed when the carriage is elevated a predetermined distance, the said means being also engageable by said carriage on its return movement for releasing the rods from their depressed positions, and spring means for elevating the said rods when the latter are so released.

5. An industrial truck comprising a frame, front wheels supporting said frame, a mast supported adjacent to its lower end by said frame for pivotal movements and means for tilting the same about its pivotal support, a carriage movable along said mast and a load support projecting forwardly from the lower portion thereof; a shoe pivotally supported by said mast adjacent to the lower end of the latter, a rod slidably mounted on said mast and connected at its lower end to said shoe, a bearing plate member carried by the upper end of the said rod, an operating member for depressing the said rod, the said operating member being pivoted to the mast above the bearing member and having a cam projection at one end thereof and a forked arm at the opposite end thereof, a projection mounted on the carriage and adapted to enter the space between the forks on said arm thereby to rock the operating member by the upward movement of said carriage and to depress the rod by the action of the cam on the bearing member, the forks of the said arm being adapted to receive the projection on the downward movement of the carriage thereby to rock the operating member in the reverse direction and to release the bearing member from the action of the cam, and spring means exerting a lifting force against the rod in opposition to the depression of the same by said cam.

6. An industrial truck comprising a frame, front wheels supporting said frame, a mast comprising side members supported adjacent to their lower ends by said frame for pivotal movements and means for tilting the same about their pivotal support, a carriage movable along said mast and a load support projecting forwardly from the lower portion thereof; a shoe pivotally supported by said side members adjacent to the lower ends thereof, a rod slidably mounted on each of said side members and each connected at its lower end to said shoe, a bearing member carried by the upper end of each of the said rods, operating members for depressing the said rods, the said operating members being pivoted to the respective side members of the mast above the bearing members and each having a cam projection at one end thereof and a forked arm at the opposite end thereof, rollers mounted on the carriage and adapted to enter the spaces between the forks on said arms thereby to rock the operating members by the upward movement of said carriage and to depress the rods by the action of the cams on the bearing members, the forks of the said arms being adapted to receive the rollers on the downward movement of the carriage thereby to rock the operating members in the reverse direction and to release the bearing members from the action of the cams, and spring means exerting a lifting force against the rods in opposition to the depression of the same by said cams.

7. An industrial truck comprising a frame, wheels supporting the frame, a mast tiltably supported on the frame, a carriage movable along the mast including a load support projecting outboard from said wheels, and a stabilizing support mounted on the mast movable between an inactive position in which it is held clear of the surface beneath the mast throughout the range of tilt of the mast and an active position in which it is disposed to engage the said surface when the mast is tilted outwardly.

8. An industrial truck comprising a frame, wheels supporting the frame, a mast tiltably supported on the frame, a carriage movable along the mast including a load support projecting outboard from said wheels, a stabilizing support mounted on the mast movable between an inactive position in which it is held clear of the surface beneath the mast throughout the range of tilt of the mast and an active position in which it is disposed to engage the said surface when the mast is tilted outwardly, and means responsive to upward movement of the carriage to move the said support to its active position.

9. An industrial truck comprising a frame, wheels supporting the frame, a mast tiltably supported on the frame, a carriage movable along the mast including a load support projecting outboard from said wheels, a stabilizing support mounted on the mast movable between an inactive position in which it is held clear of the said surface beneath the mast throughout the range of tilt of the mast and an active position in which it is disposed to engage the said surface when the mast is tilted outwardly, and means responsive to downward movement of the carriage to move the said support to its inactive position.

10. An industrial truck comprising a frame, wheels supporting the frame, a mast tiltably supported on the frame, a carriage movable along the mast including a load support projecting outboard from said wheels, and a stabilizing support coupled to the mast movable between an inactive position in which it is held clear of the surface beneath the mast throughout the range of tilt of the mast and an active position in which it is disposed to engage the said surface when the mast is tilted outwardly.

11. An industrial truck comprising a frame, wheels supporting the frame, a mast tiltably supported on the frame, a carriage movable along the mast including a load support projecting outboard from said wheels, and a stabilizing support for the mast movable between an inactive position in which it is held clear of the surface beneath the mast and an active position in which it is disposed to engage the said surface, and means responsive to the movement of the carriage on the mast for moving the support between its inactive and active positions.

12. An industrial truck comprising a frame, wheels supporting the frame, a mast tiltably supported on the frame, a carriage movable along the mast including a load support projecting outboard from said wheels, and a stabilizing support for the mast movable between an inactive position in which it is held clear of the surface beneath the mast and an active position in which it is disposed to engage the said surface, and means responsive to the tilt of the mast and means responsive to the movement of the carriage on the mast for moving the support between its inactive and active positions.

13. An industrial truck comprising a frame, wheels supporting the frame, a mast tiltably supported on the frame, a carriage movable along the mast including a load support projecting outboard from said wheels, and a stabilizing support for the mast movable between an inactive position in which it is held clear of the surface beneath the mast and an active position in which it is disposed to engage the said surface, and means responsive to forward tilt of the mast and upward movement of the carriage on the mast for moving the support from its inactive to its active position.

14. An industrial truck comprising a frame, wheels supporting the frame, a mast supported by the frame, a load-supporting means including a carriage movable on the mast, auxiliary support means movably mounted on said truck and movable from a retracted position to an active position for engagement with the surface below the mast, actuator means for moving said auxiliary support means from the retracted to the active position and holding the same in the active position, means movable with said load-supporting means and causing said actuator means to move said auxiliary support means to its active position upon elevation of said carriage from a point adjacent the bottom of the mast to an intermediate position on the mast, said movable means leaving said auxiliary support means in the active position upon further elevation of said carriage above said intermediate position.

15. An industrial truck comprising a frame, wheels supporting the frame, a mast supported by the frame, a load-supporting means including a carriage movable on the mast, auxiliary support means movably mounted on said truck and movable from a retracted position to an active position for engagement with the surface below the mast, actuator means for moving said auxiliary support means from the retracted to the active position and holding the same in the active position, means movable with said load-supporting means and causing said actuator means to move said auxiliary support means to its active position upon elevation of said carriage from a point adjacent the bottom of the mast to an intermediate position on the mast, said movable means leaving said auxiliary support means in the active position upon further elevation of said carriage above said intermediate position, said actuator means including abutment means engageable by said means movable with said load-supporting means on descent of said carriage past said intermediate position to retract said auxiliary support means.

16. An industrial truck comprising a frame, wheels supporting the frame, a mast supported by the frame, a load-supporting means including a carriage movable on the mast, auxiliary support means movably mounted on said truck and movable from a retracted position to an active position for engagement with the surface below the mast, spring means for urging said auxiliary load-supporting means to its retracted position, actuator means for moving said auxiliary support means from the retracted to the active position and holding the same in the active position, means movable with said load-supporting means and causing said actuator means to move said auxiliary support means to its active position upon elevation of said carriage from a point adjacent the bottom of the mast to an intermediate position on the mast, said movable means leaving said auxiliary support means in the active position upon further elevation of said carriage above said intermediate position, said actuator means including abutment means engageable by said means movable with said load-supporting means on descent of said carriage past said intermediate position to retract said auxiliary support means.

WALTER M. SHAFFER.

REFERENCES CITED

The following references are of record in the file of this patent:

UNITED STATES PATENTS

| Number | Name | Date |
|---|---|---|
| 1,977,655 | Troell | Oct. 23, 1934 |
| 2,109,388 | Heller | Feb. 22, 1938 |
| 2,110,424 | Quayle | Mar. 8, 1938 |
| 2,189,052 | Anthony | Feb. 6, 1940 |
| 2,232,197 | Anthony | Feb. 18, 1941 |
| 2,366,378 | Barrett | Jan. 2, 1945 |
| 2,417,560 | McNamara, Jr. | Mar. 18, 1947 |
| 2,418,693 | Breslav | Apr. 8, 1947 |